United States Patent [19]
Milton

[11] 3,918,794
[45] Nov. 11, 1975

[54] LIQUID CRYSTAL OPTICAL SWITCH COUPLER

[75] Inventor: A. Fenner Milton, Washington, D.C.

[73] Assignee: The United States of America as represented by the Secretary of the Navy, Washington, D.C.

[22] Filed: Nov. 29, 1974

[21] Appl. No.: 528,588

[52] U.S. Cl. ....... 350/96 C; 350/96 B; 350/96 WG; 350/160 LC
[51] Int. Cl.² ...................... G02B 5/14; G02F 1/13
[58] Field of Search ........... 350/96 C, 96 B, 96 R, 96 WG, 350/160 LC

[56] References Cited
UNITED STATES PATENTS

| | | |
|---|---|---|
| 3,770,339 | 11/1973 | Ramaswamy ................. 350/96 R X |
| 3,791,716 | 2/1974 | Borel et al. .................. 350/160 LC |
| 3,838,908 | 10/1974 | Channin ..................... 350/96 WG X |

*Primary Examiner*—Siegfried H. Grimm
*Attorney, Agent, or Firm*—R. S. Sciascia; Arthur L. Branning; Melvin L. Crane

[57] ABSTRACT

An optical switch to divert a portion of optical energy from a multimode transmission line. Two rod-like dielectric materials positioned adjacent each other sandwich a liquid crystal material between the two. Input and output fiber bundles are connected to each of the rods. By use of optically transparent electrodes the index of refraction of the liquid crystal is controlled to pass one polarization of light when the crystal index of refraction is the same as the two rod-like dielectric materials and no light transfers when the index of refraction is lower.

7 Claims, 5 Drawing Figures

LIQUID CRYSTAL OPTICAL SWITCH COUPLER

BACKGROUND OF THE INVENTION

This invention relates to optical switches and more particularly to an optical switch in which optical radiation traveling in a multimode fiber bundle transmission line may be switched into another optical transmission line.

Heretofore optical radiation has been coupled onto and off of multimode fiber optical transmission lines by means of optical "T" access couplers which are not electrically controllable.

Liquid crystals have been used in optical waveguides, in communication systems as well as in image storage devices. Liquid crystal definitions, description, and uses have been set forth in a publication NRL Report 7507, "Prospectus for the Development of Liquid Crystal Waveguides," by Joel M. Schnur and Thomas G. Giallorenzi dated Nov. 10, 1972 and published by the Naval Research Laboratory, Washington, D.C. 20375. Liquid crystals as described in the NRL Report 7507 may be used in carrying out this invention.

SUMMARY OF THE INVENTION

This invention incorporates a liquid crystal with a pair of dielectric material rods to switch optical radiation from one multimode fiber bundle transmission line to another transmission line by use of optically transparent electrodes to which an electrical source is applied. Without applying an electric field, the liquid crystal has a lower index of refraction than the dielectric material rods, and as such reflects optical radiation traversing the rod from a fiber bundle transmission line. Application of an electrical voltage across the liquid crystal, increases the index of refraction of the liquid crystal to that of the dielectric material rods. Therefore, optical radiation of one polarization will not be reflected by the liquid crystal and will be free to transfer from one dielectric rod to another. Removal of the electrical field changes the index of refraction back to its original value and no radiation will be transferred from one dielectric rod to another. The device of this invention may be inserted into an optical transmission line in which the main rod-like dielectric transmission section forms a straight through radiation transmission path, if the liquid crystal is in its low index condition. A fraction of the radiation may be coupled off whenever there is an index match between the liquid crystal and the optical material of the coupler. No coupling of radiation from one transmission path to the other will take place when the index of refraction of the liquid crystal is less than that of the coupler transmission lines.

DETAILED DESCRIPTION

Figure 1:
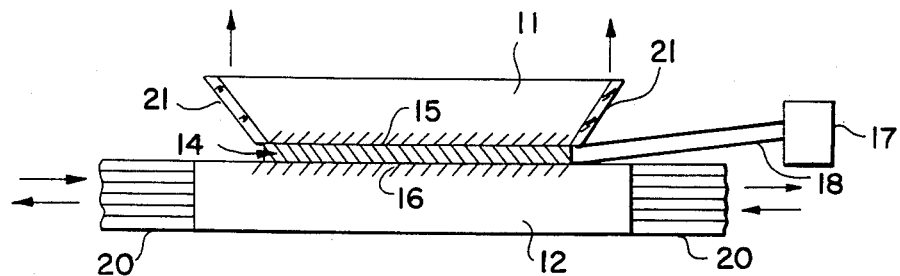
FIG. 1 illustrates a side view of an optical coupler of this invention.

Now referring to the drawing there is illustrated in FIG. 1 as well as the modifications thereof optical radiation coupling means for coupling, if desired, optical radiation from one multimode fiber bundle transmission line to another line. As shown in the drawing, FIG. 1 illustrates two cylindrical dielectric material rods 11 and 12 each having the same index of refraction and may include a reflective cladding thereon having an index of refraction which is less than that of the rods. The rods are flattened and the cladding removed on adjacent surfaces and sandwiched therebetween a thin layer of a nematic liquid crystal 14 which has a normal index of refraction which is less than that of the dielectric rods. Optically transparent electrodes 15,16 are placed between the flat surfaces of the rods and the liquid crystal. The optically transparent electrodes do not affect the reflectivity of the optical radiation on passing through the rods. A voltage source 17 controlled by switch 18 is connected to the electrodes in order to apply a voltage across the electrodes when desired.

The ends of dielectric material rod 11 are cut on a 45 degree angle and a mirror 21 is secured thereto in order to reflect radiation coupled along the length of the rod out of the rod in a direction normal to rod 12 when the radiation is incident on one of the end mirrors. The ends are cut such that there is a spacing between the cut end mirrored surface and the surface of the rod.

In operation of the device of FIG. 1, light rod 12 is connected in end-to-end relationship with a multimode fiber bundle transmission line 20 of equi-cross sectional area. (That is a transmission line on each end of rod 12). Optical radiation transmitted through the fiber optics of the transmission line will pass into the end of rod 12, be reflected by the outer coating as is well known in the art, out the opposite end of the rod and into the transmission line joined to that end. When desired, to couple radiation from the transmission line into another line, a voltage is applied across the optically transparent electrodes. The voltage applied, changes the index of refraction of the liquid crystal sandwiched between the two rods 11 and 12 to match the index of refraction of the two rods. When the index of refraction of the liquid crystal equals that of the rods for one polarization, light of one polarization will be coupled from the one rod to the other and out of the other rod when incident on the mirror. The light may be transmitted in either direction through the coupler. If traveling from left-to-right, the radiation will be coupled into the mirrored rod and emerge from the right end. The light not coupled into the mirrored rod will pass on through the transmitting rod into the multimode fiber bundle transmission line connected thereto. If desired, radiation may be coupled from the mirrored rod into the rod connected into the multimode fiber bundle transmission line and out through the line. Light may enter from either direction for coupling into or out of the transmission lines 20.

Figure 2:
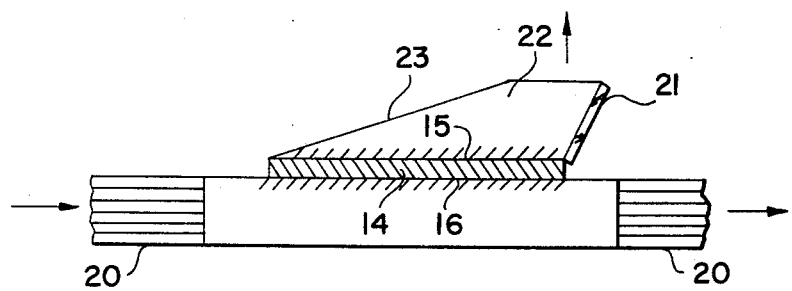
FIG. 2 is a modification in which one transmission line is on a taper.

FIG. 2 illustrates a one way radiation coupler which serves to reduce the angular spread of the optical rays coupled from a multimode fiber bundle transmission line to another line. The upper dielectric material rod 22 is cut on a taper 23 from the radiation entrance direction up to the upper surface. The tapered surface has the same clad coating as the dielectric rod material. The opposite end of the upper rod is provided with a mirror 21 that reflects radiation upwardly from the rod.

The device includes the lower rod 12 and liquid crystal with electrodes as set forth above for FIG. 1.

In operation, a fraction of the optical radiation entering the bottom rod 12 from the left with a voltage applied to the electrodes will be coupled into the upper rod through the liquid crystal. The fraction of radiation coupled out will be directed along the length of the upper rod, will be incident on the mirrored end and reflected out to a desired system. The fraction of radiation not coupled out will pass through rod 12 into the multimode fiber bundle transmission line. In this device radiation can pass only in one direction, from left-to-right.

Figure 3:
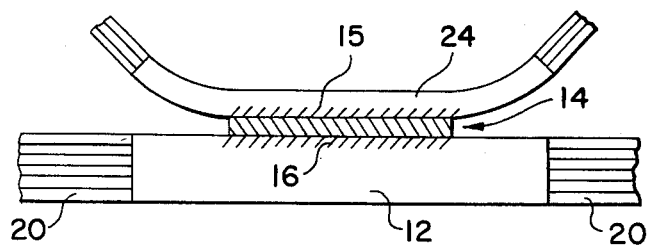
FIG. 3 illustrates a modification which includes a somewhat U-shaped transmission line.

FIG. 3 is a modification similar to that of FIG. 1 excepting the upper dielectric material rod 24 is curved at each end with a straight portion that is in contact with the bottom rod 12. The liquid crystal and electrodes are the same as for the device FIG. 1. In the modification of FIG. 3, light may be coupled from either direction from the upper rod to the bottom rod or from the bottom rod to the upper rod. In this device a multimode fiber bundle transmission line may be connected to each end of the upper and lower rods. Operation for coupling radiation from one rod to the other is the same as for the device of FIG. 1. The outer surfaces of each rod not in contact with the liquid crystal can be clad as is well known in the fiber optic art.

Figure 4:
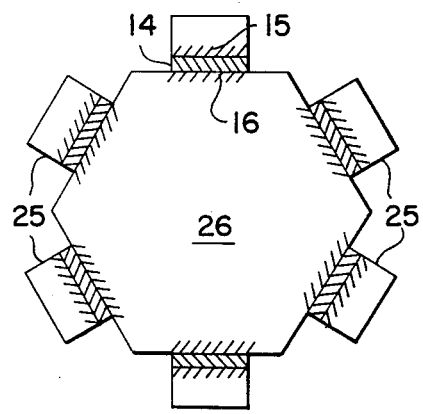
FIG. 4 illustrates a cross sectional view of an arrangement in which six switch elements are used.

FIG. 4 illustrates the cross section of a coupler including six coupling switches 25. The cross-sectional area of the coupler rod 26 to which the six switches are in contact is shaped into six sides with the outer ends thereof having a cross sectional area equal the cross section area of the end of the multimode fiber bundle transmission lines to which the coupler rod is connected. The outer six rods may be of different constructions such as shown in FIGS. 1–3. Thus, the coupler could be used as a one way coupler as in the device of FIG. 2 or used for either direction transmission as described for the devices of FIGS. 1 and 3. The coupling switches are controlled as set forth above where one, two, etc. or all may be coupled at the same time. The radiation not coupled out will be transmitted into the fiber bundle transmission line. Of course, radiation may be coupled from either direction depending on the outer rod.

Figure 5:
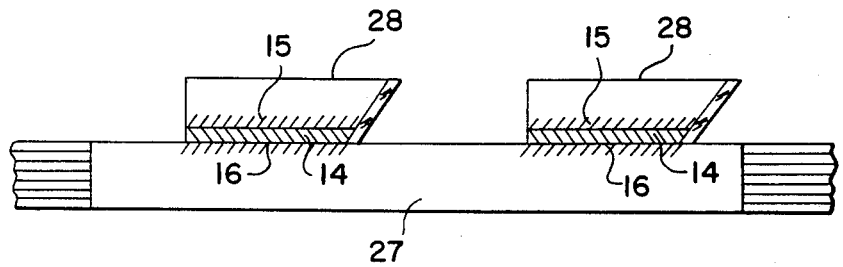
FIG. 5 illustrates more than one output transmission line in conjunction with a single transmission line.

FIG. 5 illustrates an elongated bottom rod 27 with two separate couplers 28 in series, secured in contact therewith, with the liquid crystal sandwiched in between. Thus, radiation may be coupled through each of the coupler switches as set forth above. Further, the upper coupler rods may as described above for the other modifications, couple radiation in either direction or in one direction depending upon the structure of the upper rod. Different upper rod structures may be added such as shown and described above in the different modifications.

The various modifications may be used to couple radiation from a through transmission line to another line or to add radiation to a through line from an auxiliary line. Further, the upper and lower coupler rods may be in separate through lines and radiation coupled from one to the other.

Since the liquid crystal is anisotropic, only one polarization of light can be switched from one coupler rod to the other. The cross sectional areas of the rods should match the cross sectional area of the multimode fiber bundle transmission lines connected to the coupler rods. Each of the coupler rods should have a flat surface at the connection between the adjacent rods so that the radiation may be coupled therebetween.

As pointed out above, the adjacent coupler rods should have the same index of refraction so that the index of refraction of the liquid crystal be the same as that of the rods when the voltage across the electrodes on opposite sides of the liquid crystal is applied. With the voltage applied across the electrodes raising the index of refraction of the liquid crystal to that of the rods, the two rods in the coupler will act as one larger integrating volume. When the voltage is not applied, the index of refraction of the liquid crystal is less than that of the rods, the two rods are isolated from each other for radiation rays which do not make a large angle with the axis of the rods. The angles required for a ray to be reflected and pass through an optical rod is well known in the prior art and believed not to require further discussion.

The couplers described above may be inserted into one or more optical radiation transmission lines for coupling radiation from one line to another. Without a field applied to the electrodes the coupler acts as a through path. With the electric field applied to the electrodes, the coupler couples radiation from one path to another, that is the radiation with the proper polarization will be switched from one line to another through the coupler.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An optical coupler for switching a portion of optical radiation traversing a multimode fiber bundle transmission line to at least one other optical transmission line which comprises:
   a first elongated solid optical transmission rod connected into a multimode fiber bundle transmission line;
   said rod having the same cross sectional area as said transmission line at the connection;
   at least one elongated solid optical transmission rod assembled adjacent said first rod with its length along side said first rod and connected to a multimode fiber transmission line;
   said first rod and said rods assembled adjacent thereto having flat surfaces along their adjacent alignment, and have the same optical index of refraction;
   a liquid crystal between said first rod, and said rods assembled along side thereof along the adjacent flat surfaces thereon;
   said liquid crystal having a normal index of refraction less than that of said rods;
   a pair of optically transparent electrodes on opposite sides of said liquid crystal along said flat surfaces on said rods;
   whereby an electrical voltage changes the index of refraction of said liquid crystal to that of said rods thereby permitting radiation coupling between said rods.

2. An optical coupler as claimed in claim 1; in which there is only one elongated solid rod adjacent said first rod.

3. An optical coupler as claimed in claim 2; wherein, said one elongated solid rod has a mirror at each end with the mirror at a 45 degree angle relative to said first rod.

4. An optical coupler as claimed in claim 2; wherein, said one elongated solid rod has a mirror at only one end with said mirror at a 45 degree angle relative to said first rod.

5. An optical coupler as claimed in claim 1; in which, a plurality of elongated solid rods are assembled along said first rod with adjacent flat faces and a liquid crystal and pair of electrodes related to each rod.

6. An optical coupler as claimed in claim 5; wherein, each of said plurality of solid rods are spaced from each other about the circumference of said first rod.

7. An optical coupler as claimed in claim 5; wherein, said plurality of solid rods are assembled in series along the length of said first rod.

* * * * *